(12) United States Patent
Cheng et al.

(10) Patent No.: US 9,400,739 B2
(45) Date of Patent: Jul. 26, 2016

(54) CAPACITY FORECASTING BASED ON CAPACITY POLICIES AND TRANSACTIONS

(71) Applicant: International Business Machines Corporation, Armonk, NY (US)

(72) Inventors: Sonia Cheng, Deerfield Beach, FL (US); Pamela H. Hurwitch, New York, NY (US); Roman Kisin, San Jose, CA (US); Anirudh Oswal, Jersey City, NJ (US); Deidre Paknad, Palo Alto, CA (US); Irina Simpson, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 14/069,399

(22) Filed: Nov. 1, 2013

(65) Prior Publication Data
US 2015/0127920 A1 May 7, 2015

(51) Int. Cl.
| | |
|---|---|
| *G06F 12/02* | (2006.01) |
| *G06F 11/34* | (2006.01) |
| *G06F 9/46* | (2006.01) |
| *H04L 12/24* | (2006.01) |

(52) U.S. Cl.
CPC ............... *G06F 12/02* (2013.01); *G06F 9/466* (2013.01); *G06F 11/3442* (2013.01); *G06F 11/3419* (2013.01); *G06F 2201/87* (2013.01); *H04L 41/0893* (2013.01)

(58) Field of Classification Search
None
See application file for complete search history.

(56) References Cited

U.S. PATENT DOCUMENTS

| | | | | |
|---|---|---|---|---|
| 6,330,572 | B1* | 12/2001 | Sitka | 707/608 |
| 8,423,344 | B1* | 4/2013 | Saghier et al. | 703/22 |
| 8,515,910 | B1* | 8/2013 | Certain et al. | 707/637 |
| 2003/0220899 | A1* | 11/2003 | Numanoi et al. | 707/1 |
| 2011/0161406 | A1* | 6/2011 | Kakeda et al. | 709/203 |
| 2011/0314069 | A1* | 12/2011 | Alatorre et al. | 707/827 |
| 2012/0023233 | A1* | 1/2012 | Okamoto et al. | 709/226 |
| 2012/0324092 | A1 | 12/2012 | Brown et al. | |
| 2013/0198476 | A1* | 8/2013 | Nakajima et al. | 711/165 |
| 2015/0081964 | A1* | 3/2015 | Kihara | G06F 3/0611 711/114 |

FOREIGN PATENT DOCUMENTS

| | | |
|---|---|---|
| JP | 2008090496 | 4/2008 |
| JP | 2009176060 | 8/2009 |

OTHER PUBLICATIONS

Gibbs, G. Benton, et al.; IBM eserver pSeries Sizing and Capacity Planning—A Practical Guide; Mar. 2004.

(Continued)

*Primary Examiner* — Prasith Thammavong
*Assistant Examiner* — Jason Blust
(74) *Attorney, Agent, or Firm* — James L. Baudino

(57) ABSTRACT

According to one aspect of the present disclosure, a system and technique for capacity forecasting is disclosed. The system includes a host having a processor unit and a memory. Resource data stored associated with an environment is stored in the memory, the resource data comprising inventory information of applications, processing resources and storage resources of the environment. A ledger module is executable by a processor unit to: create a capacity-associated transaction; identify and link at least one of an application, processing resource and storage resource to the transaction from the resource data; determine an initiation time and duration associated with the transaction; and forecast a change in capacity of at least one linked storage resource for the transaction and a time of the change in capacity.

13 Claims, 4 Drawing Sheets

(56) References Cited

OTHER PUBLICATIONS

Moncrief, Teresa, et al.; Storage Monitoring and Forecasting at the ERDC and MSRC; Proceedings of the Users Group Conference (DOD-UGC'05); 2005.

Armstrong, Richard M.; Capacity Planning and Performance Management Methodology; Aug. 31, 1982 (electronic publication Mar. 30, 2007).

* cited by examiner

CAPACITY FORECASTING BASED ON CAPACITY POLICIES AND TRANSACTIONS

BACKGROUND

The growth rate of information may far exceed information technology (IT) budgets for storing and/or managing such data. For example, accumulating and storing data can become expensive as additional storage resources may be needed to accommodate the continued accumulation and storage of such data. Many IT processes may call for evaluating methods for reducing such costs, such as reducing the amount of data stored, archiving data in lower cost storage devices, disposing of data, or decommissioning unused resources.

BRIEF SUMMARY

According to one aspect of the present disclosure a system and technique for capacity forecasting is disclosed. The system includes a host having a processor unit and a memory. Resource data associated with an environment is stored in the memory and comprises inventory information of applications, processing resources and storage resources of the environment. A ledger module is executable by the processor unit to: create a capacity-associated transaction; identify and link at least one of an application, processing resource and storage resource to the transaction from the resource data; determine an initiation time and duration associated with the transaction; and forecast a change in capacity of at least one linked storage resource for the transaction and a time of the change in capacity.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
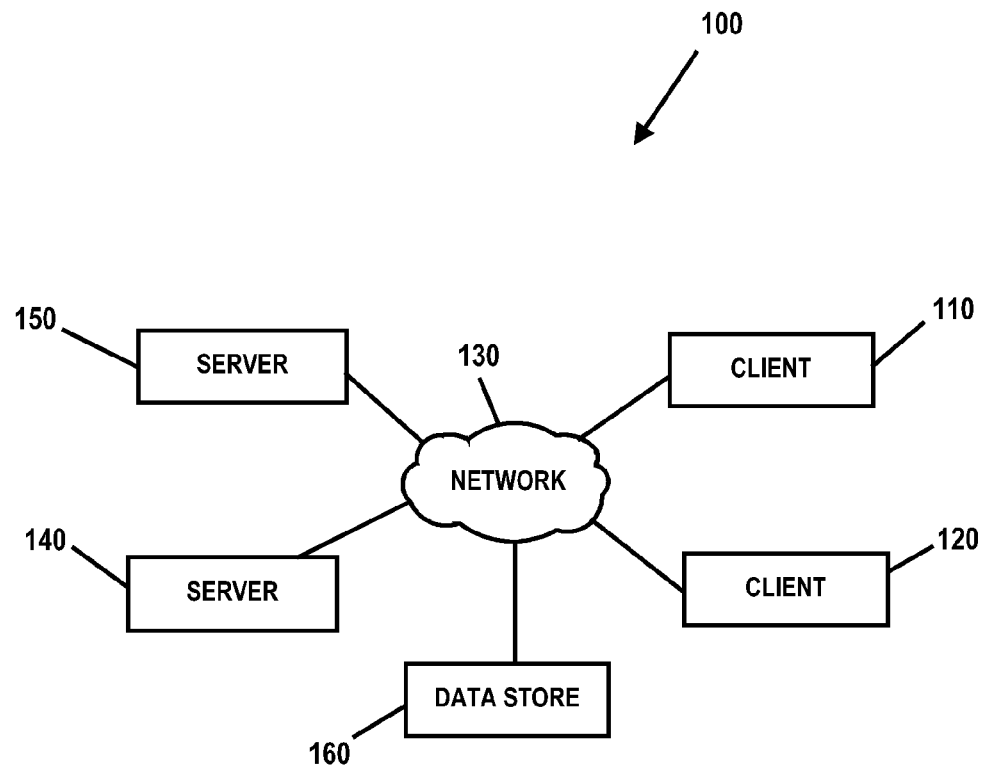
FIG. 1 is an embodiment of a network of data processing systems in which the illustrative embodiments of the present disclosure may be implemented.

Embodiments of the present disclosure provide a method, system and computer program product for capacity forecasting based on enterprise policies and capacity-related events. For example, in some embodiments, the method and technique includes: storing, in a memory, resource data associated with an environment, the resource data comprising inventory information of applications, processing resources and storage resources of the environment; and providing a ledger module executable by a processor unit to: create a capacity-associated transaction; identify and link at least one of an application, processing resource and storage resource to the transaction from the resource data; determine an initiation time and duration associated with the transaction; and forecast a change in capacity of at least one linked storage resource for the transaction and a time of the change in capacity. Thus, embodiments of the present disclosure enable capacity-related transactions to be created, edited, deleted, duplicated, prioritized, and a history of changes recorded and viewed. A ledger module according to the present disclosure enables planning scenarios to be evaluated and goals to be set in terms of cost and capacity savings. Once a capacity-related transaction scenario has been created, users can add/remove existing ledger transactions and organize them in a series or wave of activities. Transactions may be evaluated for freed/consumed capacity, and key metrics may be compared for several scenarios (combined freed/consumed capacity, duration, costs, number of transactions, timing, etc.). Once a planned transaction is confirmed and/or carried out, actual capacity change values for the freed and consumed capacity may be entered/determined and used for future forecasting.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
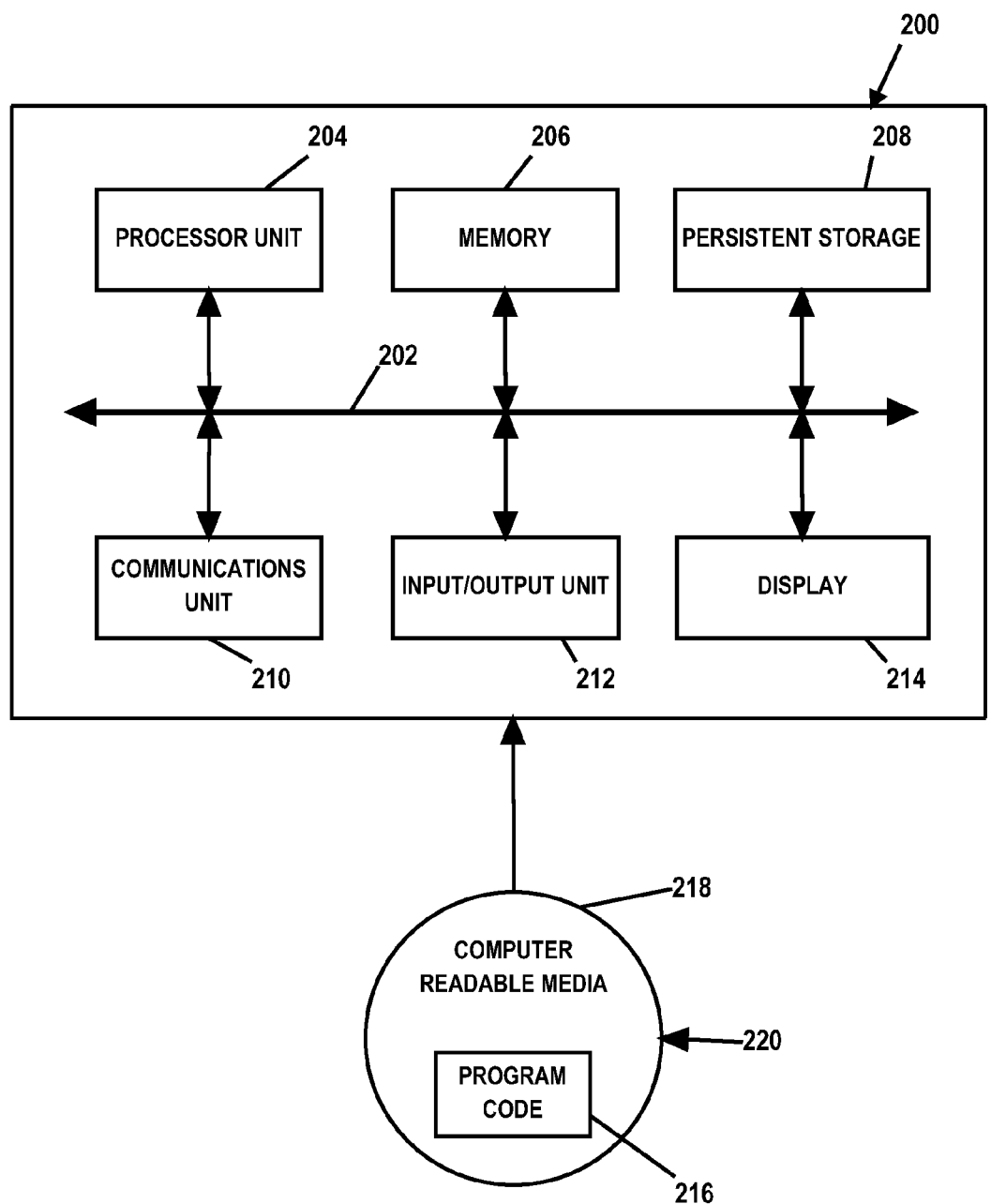
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for capacity forecasting for an environment according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
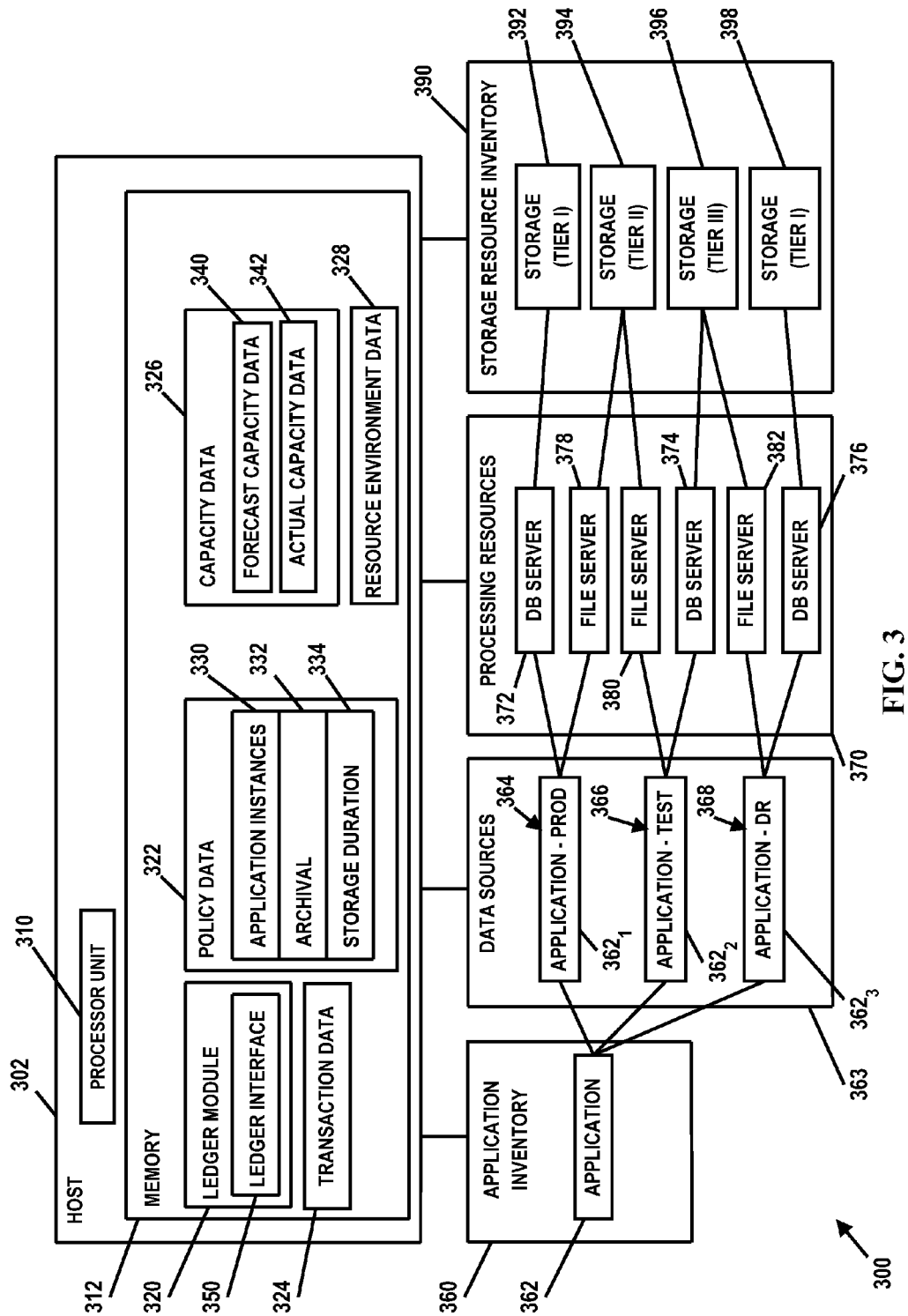
FIG. 3 is a diagram illustrating an embodiment of a computing environment in which illustrative embodiments of a capacity forecasting system according to the present disclosure may be implemented.

FIG. 3 is a diagram illustrating a computing environment in which an embodiment of a system 300 for capacity forecasting according to the present disclosure may be implemented. In the illustrated embodiment, system 300 includes a host 302 such as, but not limited to, client 110 and/or server 140, having a processor unit 310 and a memory 312. In FIG. 3, memory 312 includes a ledger module 320 for forecasting storage capacity and/or changes in storage capacity for one or more storage resources of the environment based on capacity-associated transactions. Ledger module 320 may be implemented in any suitable manner using known techniques that may be hardware-based, software-based, or some combination of both. For example, manager 320 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In some embodiments, ledger module 320 is configured to forecast the capacity that is going to be freed, or forecast changes in capacity of different storage resources, due to capacity-freeing actions in an enterprise/environment. Various capacity freeing actions or activities, hereinafter referred to as transactions, are received and tracked in ledger module 320. These transactions tie a specific action or activity to a specific environment type (e.g., production, quality assurance, test, etc.), location (e.g., data center), array type (e.g., tier of storage resource), array serial number, server name (host), instance name, database name, and quantity of capacity in a given month, for example. Each transaction has planned and actual impact entries in ledger module 320, and each transaction has a planned start/initiation date or time and duration.

In the embodiment illustrated in FIG. 3, memory 312 also includes policy data 322, transaction data 324, capacity data 326 and resource environment data 328. Policy data 322 may comprise information associated with various enterprise/environment rules or policies for performing certain activities/transactions, time periods for retaining certain types of data, archive procedures, etc. For example, in the illustrated embodiment, policy data 322 includes application instances 330, archival 332 and storage duration 324 policies. However, it should be understood that policy data 322 may include other types of policy-based rules and/or policy-based transactions for a particular enterprise. Application instances 330 policies may indicate the number of instances of particular programs or applications of an enterprise, including the location of such instances (e.g., host/server locations), the operating environment of such instances (e.g., production and/or test), etc. Archival 332 policies may indicate certain rules and/or policies associated with data backup operations and the locations for archived data. Storage duration 334 policies may indicate certain rules and/or policies for data retention, such as according to regulatory requirements, internal operating requirements, business requirements (e.g., accounting and/or legal requirements), etc.

Resource environment data 328 includes inventory information associated with various computing resources and/or the computing environment topology of an enterprise. For example, data 328 may include information associated with different operating/business environment types (e.g., production, quality assurance, test, etc.), the locations and/or quantity of certain computing resources (e.g., data center locations, application instances), array types (e.g., tiers of storage resources, such as tier 1 storage for current data, tier 2 storage for backup or archived data, etc.), array serial number, server name (host), instance name (e.g., application instances), database name, etc. Data 328 may be discovered automatically (e.g., via various environment discovery tools) and/or may be loaded manually via a user/administrator.

Transaction data 324 comprises the transactions affecting storage capacity that may be loaded/stored/tracked by ledger module 320. Transactions 324 tie a specific action or activity to certain resources of the environment, such as application instances, processing resources (e.g., hosts/servers), and storage resources. Ledger module 320 ties and/or otherwise links applications to processing resources to storage resources for capacity-freeing activities planned or performed. Each transaction 324 maintained by ledger module 320 reflects an act of work or activity performed at a point in time. Some transactions 324 increment the storage resource capacity pool because the act of work or activity results in capacity freed, and some transactions 324 decrement the storage resource capacity pool for capacity consumption as a result of another transaction 324. For example when data is archived, capacity may be freed up in a higher, more expensive storage resource array/tier but used up (usually smaller amount due to compression) in a lower, less expensive storage resource array/tier used for archiving. Ledger module 320 ties a specific amount of storage resource capacity to the transaction 324 (e.g., increased capacity for one storage resource and/or decreased capacity for another storage resource).

There may also be different types of transactions 324 such as, but not limited to: 1) Archiving of data, compression and movement of data from one tier to another (e.g., primary archiving action, post-archive database maintenance for non-production environments, by-product benefits, due to archiving, that remove history copies or duplicate data stores which functioned as archives, and backup reduction as a function of an archive); 2) Policy changes that reduce or eliminate data volumes (e.g., policy change limiting the non-production instances of applications on primary storage tiers, policy change on duration for which the backup data is stored, and policy change on retention period of production and archive data); 3) Tiering of data that shifts a volume to lower-cost storage; 4) Deletion of data that eliminates the need for storage (e.g., deletion of legacy data unrelated to archiving, retention and typically from orphan data, deletion of sequestered data released of a legal hold, deletion of legacy data unrelated to archiving and by applying the retention schedule); 5) Decommissioning of an asset/resource that eliminates stored data or asset cost (e.g., decommissioning of a server, decommissioning of an application, etc.); and 6) Recurring capacity reduction as a result of a policy change (e.g., monthly amount of capacity consumption avoided on a go-forward basis from a cumulative, recurring action that is eliminated or whose volume is reduced). It should be understood that other types of transactions 324 may also be used/identified.

Some transactions 324 may be referred to as "triggered" transaction types that will be automatically be created by ledger module 320 along with a new transaction 324 of a given type when created. For example, triggered transactions 324 may be defined by tying a transaction type to an environment pool or a specific environment. Additionally, triggered transactions 324 can be defined in a way that can control when a triggered transaction 324 should start relative to a parent transaction (e.g., same time, upon completion of the main transaction or custom offset). Triggered transactions 324 can also have their own triggered transactions, thereby creating a cascade of triggered transactions. For example, for a given transaction type (e.g., archival—primary), there could be defined one of more triggered transaction types (e.g., archival—maintenance (for all "non-production" environments that should start upon completion of the main transaction) and policy change—limiting the number of non-production environments).

Capacity data 326 may comprise information associated with changes in storage resource capacity based on transactions 324. For example, in the illustrated embodiment, capacity data 326 comprises forecast capacity data 340 and actual capacity data 342. Forecast capacity data 340 may comprise the forecast change in capacity for a storage resource associated with a transaction 324 (e.g., an increase in capacity due to an archiving process). Actual capacity data 342 may comprise information associated with current, actual storage resource capacity and/or an actual change in storage resource capacity resulting from the actual completion of a transaction 342. For example, forecast capacity data 340 may indicate a future, predicted capacity (or change in capacity) for a particular storage resource if a particular transaction 324 is performed. In response to completion of a particular transaction 324, the actual capacity (or change in capacity) for the corresponding storage resource may be determined (automatically and/or manually). In some embodiments, ledger module 320 may utilize capacity data 340 and 342 to perform future capacity forecasting (e.g., taking into account and learning from differences between the forecast capacity change and the actual capacity change for a particular transaction 324).

In the illustrated embodiment, ledger module 320 comprises a ledger interface 350. Ledger interface 350 may comprise a graphical user interface (GUI) or other type of interface enabling a user (e.g., a free capacity planner, free capacity architects, etc.) to interface with ledger module 320 (e.g., entering transactions 324, identifying/verifying linked resources associated with certain transactions 324, prioritizing activities/transactions 324 towards specific applications and data storage resources based on the storage utilization metrics, legal risks, skills required and costs, etc.). For example, a new ledger transaction 324 may be created by tying specific instance of an application/data storage resource in a specific environment to a transaction 324 type. Application and data storage resource inventory information (e.g., as set forth in environment data 328) and made available through user functionality may enable searching based on variety of applications and data storage resource attributes such as name, code, criticality, confidentiality level, vendor, status, associated organization, data source category, online data range, location, jurisdiction etc. In some embodiments, different computing environments may be globally defined in environment data 328 and split into "production" and "non-production" pools (or other applicable pool designations depending on the application). For example, production and disaster recovery environments may belong to the "production" pool, while test and quality assurance environments may be part of the "non-production" pool. The amount of processing effort and duration of the transaction 324 can often depend on the complexity of the application. A transaction 324 type may define a "tiered" duration model that enables specifying a default duration of the transaction 324 as a function of the application complexity.

Interface 350 may also enable certain transaction 324 to be included or not included (e.g., filtered) for certain planned activities. For example, a user can determine which transactions 324 to include and exclude in a particular capacity forecast. Interface 350 may be configured to enable changes to individual transactions 324 to be recorded in an audit trail. Further, multiple forecasts, work-start reports and quarterly actual reports can be produced from ledger module 320 via interface 350 including scenario forecasts with varying sensitivities. Interface 350 may enable work planning by transaction 324 type and time period to be performed/evaluated (e.g., work-start reports can be prepared and used to orchestrate activities, transactions 324 may be sorted by type and start date, identify activities to be initiated by application, server, data center, array, etc., and target completion data, etc.).

Thus, in operation, in some embodiments, each transaction 324 may be assigned/given a unique entry and/or identification (ID). The transaction 324 may be policy-based (e.g., derived from policy data 322), user-created, or a combination thereof. A particular transaction 324 may also comprise a family of transactions (e.g., a transaction associated with one storage resource may impact capacity changes in another storage resource). Ledger module 320 may tie/link a specific instance of an application/storage resource in a specific environment to a particular transaction 324. For example, in FIG. 3, an application inventory 360 (e.g., derived from environment data 328) may include various applications used in the environment/enterprise, such as application 362. Different data source 363 environments (e.g., a production (PROD) environment 364, a test (TEST) environment 366 and a disaster recovery (DR) environment 368) may each use one or more instances of application 362 (e.g., applications $362_1$, $362_2$ and $362_3$, respectively). Instances of the application 362 may also be linked to various processing resources 370, such as database servers 372, 374 and 376 and file servers 378, 380 and 382, respectively. Correspondingly, processing resources 370 may be linked/associated with a storage resource inventory 390 including storage assets such as storage resources 392, 394, 396 and 398. The storage assets of the storage resource inventory 390 may be further distinguishable based on a tier/array level of such resource (e.g., storage resources 392 and 398 may comprise a more expensive tier I resource, storage resource 396 may comprise a less expensive tier II resource, and storage resource 396 may comprise a least expensive tier III resource).

Ledger module 320 automatically estimates the transaction 324 duration based on the complexity of the transaction (e.g., based on the complexity of the application identified in environment data 328 and a tiered transaction duration definition as specified in the transaction type; based on the quantity of data to be processed (e.g., the amount of data, data compression requirements, etc.), the quantity of resources to be processed (e.g., multiple data storage resources), etc.) and forecast changes in capacity for various storage resources 390. Ledger module 320 may also automatically generate triggered transactions 324 per a transaction type definition for all the applicable instance of the application. For example, referring to FIG. 3, application 362 can be defined in environment data 328 as having three associated data source instances (e.g., applications $362_1$, $362_2$ and $362_3$) in various environments (e.g., production 364, test 366 and disaster recovery 368). A transaction type (e.g., archival—primary) may only be applicable to storage resources in the production environment where triggered transactions (e.g., archival—maintenance) may be applicable to non-production environments. When a new transaction 324 is created (e.g., archival—primary) for the production environment, ledger module 320 would automatically generate two archival—maintenance triggered transactions 324 for other environments (e.g., test and disaster recovery).

Ledger module 320 forecasts changes in capacity for one or more storage resources 390 based on the transaction 324 (e.g., base transaction and, when applicable, triggered transactions) by time (e.g., when the capacity change will occur), array type (tier) and data center/environment (e.g., production, test, etc.). The forecast capacity data 340 may thereby be used to evaluate future purchase and capacity growth planning and may drive storage resource reclamation work planning Ledger module 320 may be used to identify cost savings and avoidance actions from which benefits are realized (e.g., freed storage capacity can be consolidated, storage devices or arrays may be removed from service and their cost eliminated, free capacity can be re-allocated to avoid purchase of new capacity, etc.). Ledger module 320 may also indicate/identify certain storage resources, or data associated therewith, that may be consolidated and/or decommissioned (e.g., identifying data on multiple same-tier resources that may be consolidated to facilitate decommissioning of a resource).

Figure 4:
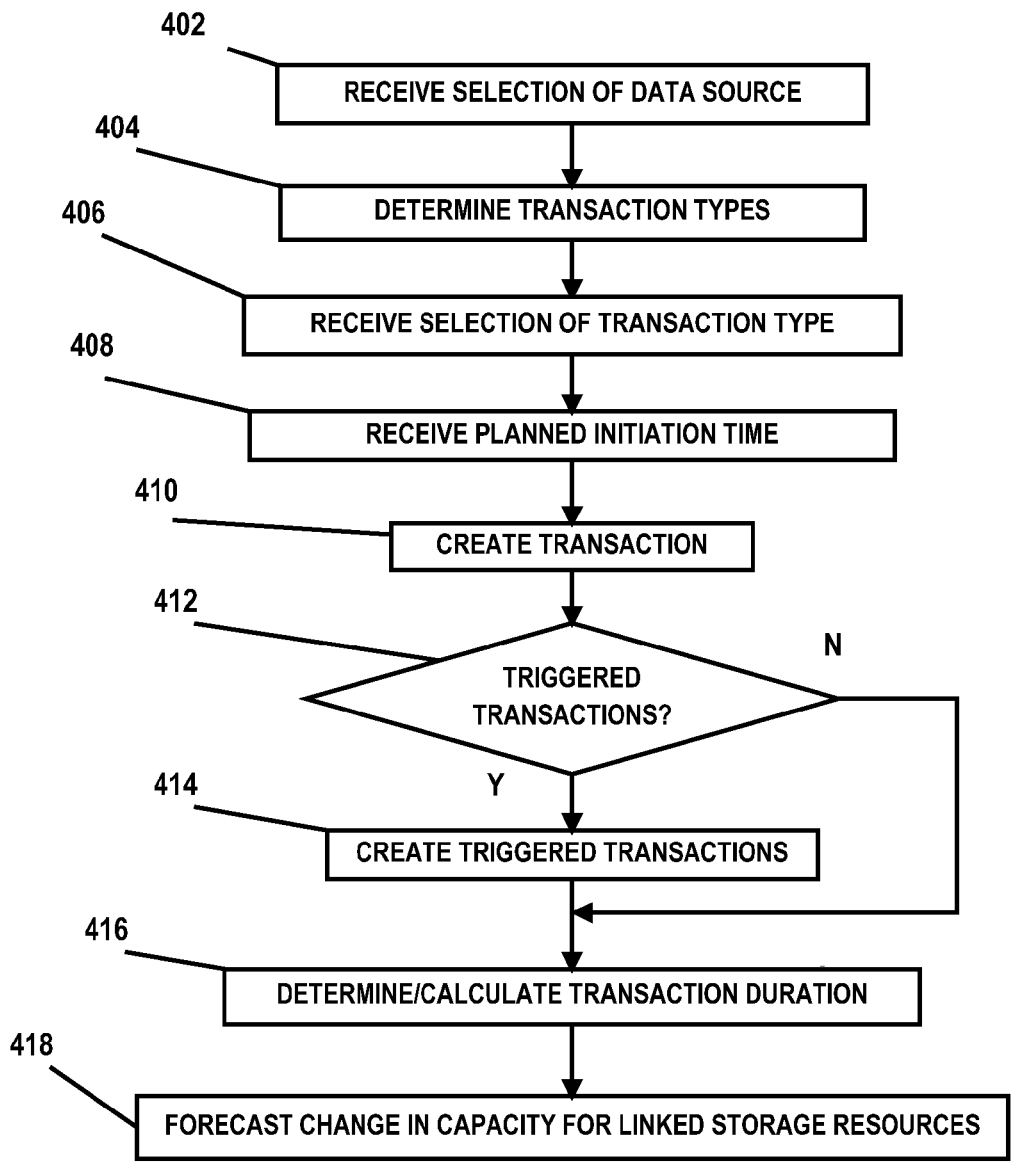
FIG. 4 is a flow diagram illustrating an embodiment of a method for dynamic reconfiguration of network devices for outage prediction according to the present disclosure.

FIG. 4 is a flow diagram illustrating an embodiment of a method for capacity forecasting according to the present disclosure. The method begins at block 402, where a selection and/or indication of a particular data capacity-related source is received (e.g., a particular application, computing environment, processing resource, storage resource, etc.). In some embodiments, interface 350 may be used by an administrator/user to identify a capacity-related data source and/or resource for which a transaction 324 may be created. It should be understood that the process and/or method of creating a transaction 324 may vary (e.g., identifying a particular environment and then being presented with a list of applications/data sources for which a transaction may be created; selecting an application and then being presented with different environments in which instances of the application are deployed; etc.). At block 404, ledger module 320 may determine/identify different transaction 324 types applicable to the selected data source (e.g., archival processes, data deletion, etc.) and ledger module 320 may thereafter present a list of different transaction 324 types for selection by the user to apply or use for the current transaction 324.

At block 406, ledger module 320 receives a selection of a particular type of transaction 324 to apply for the selected resource. At block 408, ledger module 320 receives a planned initiation time of the transaction 324. At block 410, ledger module 320 creates the primary or parent transaction 324 and links and/or ties one or more of applications, processing resources and/or storage resources to the transaction 324. At decisional block 412, a determination is made whether there are triggered transactions to be created based on the created transaction. If not, the method proceeds to block 416. If there are triggered transactions to be created, the method proceeds to block 414, where one or more sibling and/or triggered transactions are created based on the primary or parent transaction. In some embodiments, ledger module 320 may cycle through the various computing environments according to environment data 328 and locate additional data sources (e.g., application instances, processing resources and/or storage resources) related to the primary transaction for creating triggered transactions. Ledger module 320 may also determine a time and/or time offset for the triggered transactions relative to the primary transaction. For example, ledger module 320 may derive and/or otherwise determine whether the triggered transactions may run concurrently with or offset from (e.g., after completion) of the primary transaction. The method then proceeds to block 416, where ledger module 320 may determine a duration of the transaction (e.g., the primary transaction and/or any triggered transaction). At block 418, ledger module 320 forecasts a change in storage resource capacity for one or more storage resources based on the transaction (e.g., the primary transaction and/or any triggered transactions). Ledger module 320 may update capacity data 326 for the forecast information and/or otherwise make such capacity data 326 available for review, prioritization, evaluation, etc., by a user of ledger module 320.

Thus, embodiments of the present disclosure enable an easily viewable and accessible overview of capacity planning and forecasting scenarios. Transactions may be created, edited, deleted, duplicated, prioritized, and a history of changes recorded and viewed. Ledger module 320 enables planning scenarios to be evaluated and goals to be set in terms of cost and capacity savings. Once a scenario has been created, users can add/remove existing ledger transactions and organize them in a series or wave of activities. Transactions may be evaluated for freed/consumed capacity, and key metrics may be compared for several scenarios (combined freed/consumed capacity, duration, costs, number of transactions, timing, etc.). Once a planned transaction is confirmed and/or carried out, actual capacity change values for the freed and consumed capacity may be entered/determined and used for future forecasting.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
    a host having a processor unit and a memory;
    resource data associated with first and second environments stored in the memory, the resource data comprising inventory information of applications, processing resources and storage resources of the first and second environments; and
    a ledger module executable by a processor unit to:
        create a capacity-associated transaction associated with the first environment;
        identify and link a first instance of an application and a storage resource of the first environment to the transaction from the resource data;
        determine an initiation time of the transaction;
        estimate a duration of the transaction based on a complexity of the transaction;
        determine, based on a type of the transaction, whether to create a triggered transaction;
        responsive to the type of the transaction associated with the first environment meeting a defined transaction type, automatically create the triggered transaction for the second environment;
        identify and link a second instance of the application and a storage resource of the second environment to the triggered transaction from the resource data; and
        forecast a change in capacity of the linked storage resources of the first and second environments and a time of the change in capacity.

2. The system of claim 1, wherein the ledger module is operable to forecast a change in capacity of at least two differently tiered storage resources.

3. The system of claim 1, wherein the ledger module is operable to:
    access policy data indicating policy-based transactions affecting storage capacity;
    schedule capacity-associated transactions based on the policy data;
    identify and link storage resources to the policy-based transactions; and
    forecast changes in capacity for the linked storage resources based on the policy-based transactions.

4. The system of claim 1, wherein the ledger module is operable to receive an indication of an actual change in capacity for the linked storage resources in response to a completion of the transactions.

5. The system of claim 1, wherein the ledger module is operable to forecast an increase in capacity and a corresponding decrease in capacity resulting from the transactions.

6. The system of claim 1, wherein the ledger module is operable to display an interface enabling a user to prioritize desired capacity-associated transactions, the ledger module operable to forecast changes in capacities of storage resources according to the prioritizations.

7. The system of claim 1, wherein the ledger module is operable to forecast at least one of an application, a processing resource and a storage resource available for decommissioning based on the transactions.

8. A computer program product for capacity forecasting the computer program product comprising:
    a non-transitory computer readable medium having computer readable program code embodied therewith, the computer readable program code comprising computer readable program code configured to:
        store resource data associated with first and second environments, the resource data including inventory information of applications, processing resources and storage resources of the first and second environments;
        create a capacity-associated transaction associated with the first environment;
        identify and link a first instance of an application and a storage resource of the first environment to the transaction from the resource data;
        determine an initiation time of the transaction;
        estimate a duration of the transaction based on a complexity of the transaction;
        determine based on a type of the transaction, whether to create a triggered transaction;
        responsive to the type of the transaction associated with the first environment meeting a defined transaction type, automatically create the triggered transaction for the second environment;

identify and link a second instance of the application and a storage resource of the second environment to the triggered transaction from the resource data; and forecast a change in capacity of the linked storage resources of the first and second environments and a time of the change in capacity.

9. The computer program product of claim 8, wherein the computer readable program code is configured to forecast a change in capacity of at least two differently tiered storage resources.

10. The computer program product of claim 8, wherein the computer readable program code is configured to:
access policy data indicating policy-based transactions affecting storage capacity;
schedule capacity-associated transactions based on the policy data;
identify and link storage resources to the policy-based transactions; and
forecast changes in capacity for the linked storage resources based on the policy-based transactions.

11. The computer program product of claim 8, wherein the computer readable program code is configured to receive an indication of an actual change in capacity for the linked storage resources in response to a completion of the transactions.

12. The computer program product of claim 8, wherein the computer readable program code is configured to forecast an increase in capacity and a corresponding decrease in capacity resulting from the transactions.

13. The computer program product of claim 8, wherein the computer readable program code is configured to display an interface enabling a user to prioritize desired capacity-associated transactions, the ledger module operable to forecast changes in capacities of storage resources according to the prioritizations.

* * * * *